(12) United States Patent
van Greunen et al.

(10) Patent No.: US 7,839,899 B2
(45) Date of Patent: Nov. 23, 2010

(54) METHOD AND SYSTEM OF UPDATING ROUTING INFORMATION IN A COMMUNICATIONS NETWORK

(75) Inventors: Jana van Greunen, Redwood City, CA (US); Sterling Hughes, Oakland, CA (US); Raj Vaswani, Portola Valley, CA (US); William San Filippo, III, Los Altos Hills, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 238 days.

(21) Appl. No.: 12/057,970

(22) Filed: Mar. 28, 2008

(65) Prior Publication Data

US 2009/0245270 A1    Oct. 1, 2009

(51) Int. Cl.
*H04J 3/07* (2006.01)
*G01R 31/08* (2006.01)

(52) U.S. Cl. ..................... 370/503; 370/252
(58) Field of Classification Search ............... 370/503, 370/401
See application file for complete search history.

(56) References Cited

U.S. PATENT DOCUMENTS

| | | | | |
|---|---|---|---|---|
| 6,331,984 | B1 * | 12/2001 | Luciani | 370/401 |
| 7,215,955 | B2 * | 5/2007 | Forssell | 455/433 |
| 7,414,997 | B2 * | 8/2008 | Lauer | 370/338 |
| 2002/0077800 | A1 * | 6/2002 | Kampe | 703/21 |
| 2002/0181409 | A1 | 12/2002 | Shen | |
| 2005/0152286 | A1 | 7/2005 | Betts et al. | |
| 2005/0213498 | A1 | 9/2005 | Appanna et al. | |
| 2006/0053216 | A1 * | 3/2006 | Deokar et al. | 709/223 |

(Continued)

OTHER PUBLICATIONS

Ching-Hua Chuan et al., "Cache Management of Dynamic Source Routing for Fault Tolerance in Mobile Ad Hoc Networks", Dependable Computing, 2001, Proceedings, 2001 Pacific Rim International Symposium on Seoul, South Korea, Dec. 17-19, 2001, pp. 199-205.

(Continued)

*Primary Examiner*—Derrick W Ferris
*Assistant Examiner*—Angel Brockman
(74) *Attorney, Agent, or Firm*—Buchanan, Ingersoll & Rooney, PC (57) ABSTRACT

A method of updating routing information in a network where reboot information of other nodes in the network is used to determine whether a given node has recent route updates. If the reboot information indicates the given node has not recently rebooted, then routing information from that given node is used to update the routing information of the comparing node. The reboot information may be a reboot counter which is incremented by a node in response to the node going through a reboot process. When a node reboots, it may request the reboot counter from neighboring nodes. The received reboot counter is compared to the stored reboot counter for at least one node. The rebooting node may choose to receive routing information from a node which has not had its reboot counter changed from the stored reboot counter. In the event none of the neighboring nodes have an unchanged reboot counter, requests may be made for the reboot counters of other nodes, which may be compared to the corresponding stored reboot counters, until the rebooting node discovers a node which has not recently rebooted according to the reboot counter, and may then download routing information from that node.

26 Claims, 5 Drawing Sheets

U.S. PATENT DOCUMENTS

2008/0089348 A1*  4/2008  Appanna et al. ............ 370/401
2008/0192762 A1*  8/2008  Kompella et al. ........... 370/410
2009/0116496 A1*  5/2009  Savage et al. ............... 370/400

OTHER PUBLICATIONS

J. Moy, Sycamore Networks; P. Pillay-Esnault, Juniper Networks; A. Lindem, Redback Networks, "Graceful OSPF Restart", IETF Standard, Internet Engineering Task Force, Nov. 1, 2003, pp. 1-18.

E. Chen, Cisco Systems; R. Fernando, J. Scudder, Y. Rekhter, Juniper Networks, "Graceful Restart Mechanism for BGP", IETF Standard, Internet Engineering Task Force, Jan. 1, 2007, pp. 1-15.

M. Shand, L. Ginsberg, Cisco Systems, "Restart Signaling for Intermediate System to Intermediate System (IS-IS)", IETF Standard, Internet Engineering Task Force, Jul. 1, 2004, pp. 1-21.

Partial International Search Report, dated Jun. 18, 2009.

International Search Report and Written Opinion dated Feb. 8, 2010 from corresponding International Application No. PCT/US2009/001881.

Invitation to Pay Additional Fees With Partial International Search Report, dated May 17, 2010 from International Application No. PCT/US2010/000761 corresponding to related U.S. Appl. No. 12/411,567.

International Search Report and Written Opinion dated Jul. 5, 2010 from International Application No. PCT/US2010/000761 corresponding to related U.S. Appl. No. 11/411,567.

* cited by examiner

METHOD AND SYSTEM OF UPDATING ROUTING INFORMATION IN A COMMUNICATIONS NETWORK

FIELD OF THE INVENTION

The present invention relates to routing of packets in a communications network.

BRIEF DESCRIPTION OF THE DRAWINGS

The foregoing aspects and many of the attendant advantages of this invention will become more readily appreciated and becomes better understood by reference to the following detailed description, when taken in conjunction with the accompanying drawings, wherein.

DETAILED DESCRIPTION OF THE INVENTION

Figure 1:
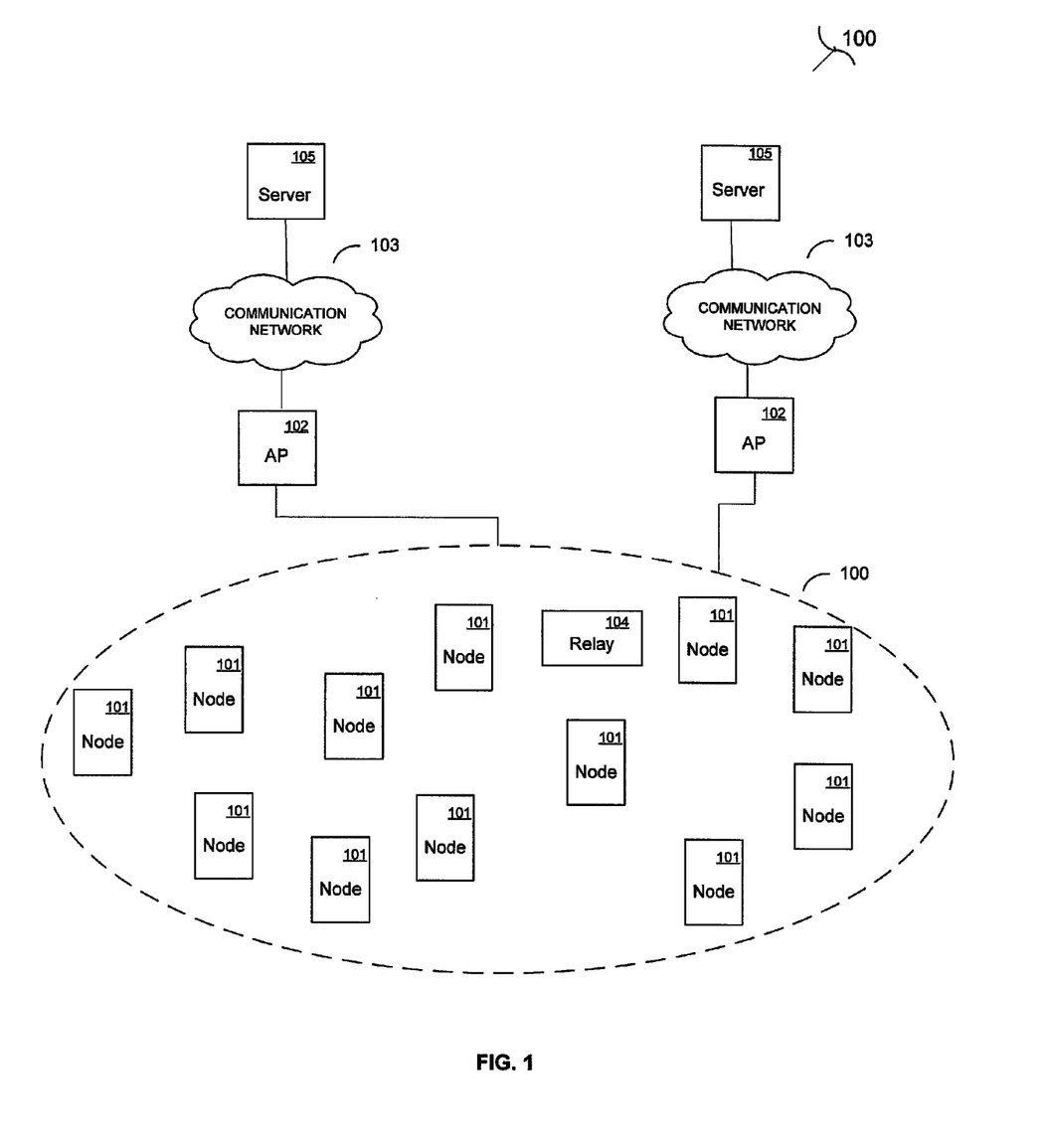
FIG. 1 is a generalized block diagram illustrating a network over which the route updating process may be implemented, according to one possible embodiment.

FIG. 1 is a generalized block diagram illustrating a communications network 100 having a plurality of nodes 101. The nodes 101 may include a processing unit, memory (for example, non-volatile memory) and a network interface. If the communications network is a wireless communication network the nodes may also include one or more radios (or wireless transceivers) to communicate with other nodes in the network. One or more nodes may also act as an access point (or gateway) 102 to another network 103. One or more electronic computing devices 105 may be connected to the communications network 103. Examples of electronic computing devices include, without limitation, servers, personal computers, handheld devices, mobile computing devices, mobile telephones, etc. One or more nodes may also be relay nodes 104 which relay packets between nodes, and/or between one or more nodes 101 and the gateway 102.

In communication networks which have access point nodes, one node may be considered "upstream" of another node in the sense that it is closer to the access point node (closer may refer to number of hops, geographic proximity, to link cost, link reliability, some combination thereof, or additional factors alone or in combination with other of the listed factors). The "downstream" node may prefer and/or choose to receive routing updates from an upstream node.

During operation of the communications network 100 a node may reboot (voluntarily or involuntarily) for any number of reasons, including, without limitation, power loss, operational maintenance, automatic service disconnects, routine node refresh after firmware upgrades, or for other reasons. When the rebooting node comes back up after a reboot, it is preferable to receive routing information from other nodes, as the rebooting node may not have been able to receive routing information updates while it was "down." As other nodes in the communications network may also have gone down and have recently rebooted, the rebooting node may prefer to receive routing updates or other updates from nodes that have not recently rebooted, or have at least rebooted prior to the rebooting node and which are more likely to have more current routing information.

Figure 2:
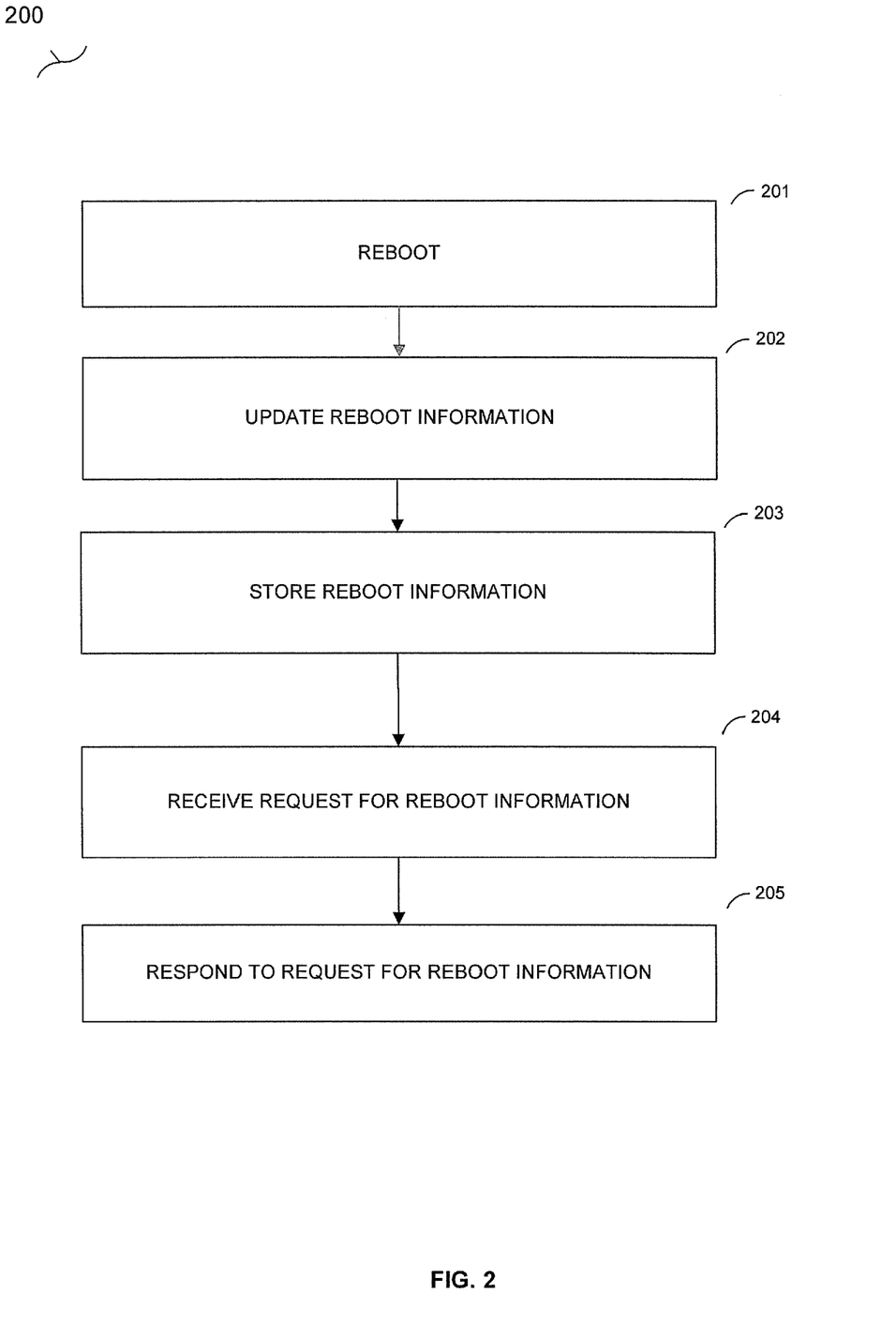
FIG. 2 is a generalized flow diagram of a process of updating reboot information and informing other nodes of reboot information, according to one possible embodiment.

FIG. 2 is a generalized flow diagram of the process of updating and providing reboot information to other nodes in the communications network. At step 201 a node reboots. In response to the reboot, at step 202 the node updates its reboot information. The node may update its reboot information during or after the reboot. If the reboot information is a reboot counter, the update may be to increment the reboot counter. The reboot counter may be incremented by one, or may be changed by some other operation on the reboot counter. If the reboot information is a reboot time stamp, the reboot time stamp will be changed to reflect the reboot. If the reboot information is a recent reboot value the recent reboot value may be set to indicate a value indicating rebooting within a predefined period of time. Other reboot information may include, without limitation, listing of latest firmware upgrades in neighbor nodes, link and path quality changes and, info success statistics among neighbor nodes. At step 203 the reboot information is stored. In one presently preferred embodiment, the reboot information is stored in non-volatile memory in the node. One example of a type of non-volatile memory is FLASH memory. Other embodiments may store the reboot information in volatile memory in the node, or volatile or non-volatile memory in a device or computer which may be accessed by the node.

At step 204 a node, such as the node that rebooted, receives a request for information from another node in the communications network. The request for information may be a specific request for reboot information, or the request may be for other information, such as a request for link or routing information. At step 205 the node responds to the request for reboot information, link information, routing information and/or other information. If the request is for routing or other information, the reboot information is preferably included with the response. Additionally, the request for information received by the node may include reboot information corresponding to other nodes in the communications network. In one alternative embodiment, reboot information is exchanged separately from routing information. In the event reboot information corresponding to other nodes is received in the request for information, the node may store the received reboot information. Preferably the storage of reboot information is in non-volatile memory of the node, such as FLASH memory. Other embodiments may store the received reboot information in volatile memory in the node, or volatile or non-volatile memory in a device or computer which may be accessed by the node.

The requesting node receives the reboot information from at least one other node. The requesting node may store the received reboot information. The reboot information may be stored in memory or a storage device associated with the node. In one preferred embodiment, reboot information is stored in non-volatile memory of the receiving node, such as FLASH memory. Other embodiments may store the received reboot information in volatile memory in the receiving node, or volatile or non-volatile memory in a device or computer which may be accessed by the receiving node.

Figure 3:
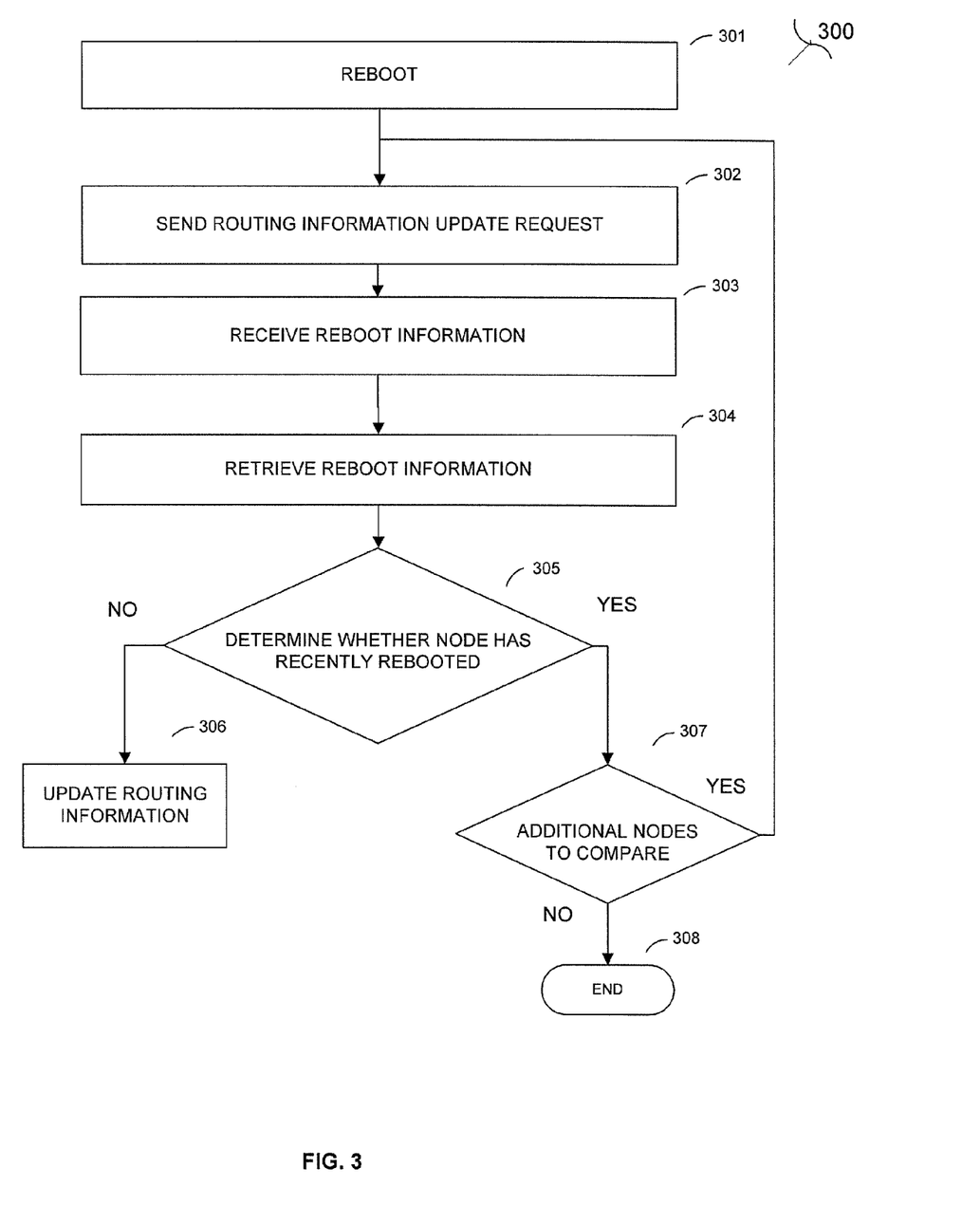
FIG. 3 is a generalized flow diagram illustrating a process of using reboot information to determine whether routing information from another node to update routing information of a given node, according to one possible embodiment.

FIG. 3 is a generalized flow diagram of process 300 of using reboot information to determine whether routing information from another node is to be used for updating routing information of a given node. At step 301 a first node (or rebooting node) reboots. During, or after, reboot the first node may initiate a routing update process where, at step 302, the first node sends routing information update messages to at least one neighboring node. In one preferred embodiment, the first node sends routing update messages to nodes which it is already aware of. The nodes the first node is aware of may be contained in a list, which may be stored in volatile or nonvolatile memory at its location or at a different location which it can securely and/or reliably access. Preferably, these nodes are neighboring nodes. Alternatively, the first node may initiate a discovery process to discover nodes, as may be done when the first node is unaware of other nodes in the communications network (as may occur due to the first node joining the network, or if the list of known nodes was lost or deleted, or when the list of known nodes is unreachable or deemed unreliable). Routing updates may include the reboot information of the first node, and may include a request for reboot information updates. The list of discovered nodes may be used for the routing update messages sent at step 302. At step 303 the first node receives the routing update information. In one preferred embodiment, the routing update information response includes reboot information. In alternate embodiments, reboot information may be received in a separate message, which may be received in response to the routing update request, in response to a reboot information request, in response to a request for other information, or automatically without a request from the rebooting node. At step 304 the first node may retrieve reboot information it keeps on other nodes. As discussed above, reboot information may be stored in memory, or in another accessible device or storage unit, and at step 304 the first node retrieves stored reboot information on other nodes from this location. In the preferred embodiment, the retrieved reboot information may correspond to at least one node associated with the received reboot information, such that the first node has access to both the stored the reboot information and the received reboot information for at least one node.

At step 305 the first node may examine, for example by comparing, the stored reboot information and the received reboot information for at least one node to determine whether the associated node, or nodes, have recently gone through a reboot. More particularly, the first node may make a determination as to whether a given node, corresponding to the stored reboot information and the received reboot information, has routing information more current than the first node. If the given node has not rebooted since receiving the corresponding stored reboot information, or if the given node has not rebooted within a predefined time prior to the reboot of the first node, then the first node may determine to use reboot information available from the given node to update its routing information. The comparison made may vary according to the type of the reboot information available. For example, if the reboot information is a reboot counter the comparison may be whether the stored reboot counter is equal to the received reboot counter. If the stored reboot counter is equal to the received reboot counter it may be determined that the given node has not rebooted since receipt of the stored reboot counter, and that the first node will update its routing information using the routing information from the given node. If at step 305 it is determined that at least one node in the comparison has routing information which is more current than the routing information of the first node, then at step 306 the first node will update the routing information using the routing information from at least one of the nodes determined to have more current routing information than the first node. If the routing information has not already been received, the first node may make a request for the routing information to be used in updating the first node.

If none of the nodes examined at step 305 are determined to have routing information more current than the first node's routing information, then at step 307 the first node may determine whether there are additional nodes which may be compared. If no additional nodes may be compared, the process may end at step 308. If at step 307 the first node determines that there are additional nodes to be compared, it may return to step 302 to obtain additional information from other nodes, and follow the process of comparison from step 302. As the first node may have compared all of the nodes that it keeps reboot information on, the first node may proceed to step 302 to request stored reboot information for other nodes as well as request reboot information from nodes corresponding to the requested stored reboot information. Alternatively, if at step 307 the first node determines that there are additional nodes to be examined for a recent reboot and the first node has the information needed for examination, then the first node may return to steps 304, 305, or any other step as appropriate.

The first node may, at step 305, compare the stored and received reboot information of other nodes known to the first node until it is able to find a node having routing information more current than the first node's routing information. This may include sending out other reboot information requests for reboot information of other nodes. If a node is found which has not recently rebooted, then the first node proceeds to step 306 to update its routing information.

The above processes may be combined, in whole or in part, with our without modification, in various embodiments. For illustration purposes, multiple exemplary embodiments are provided below.

While the above embodiments concerned updating routing information, alternate embodiments may update other information in addition to routing information, or may update other information without updating routing information.

Example 1

A wireless FHSS (Frequency Hopping Spread Spectrum) communication network of 5,000 nodes, with multiple sub-networks, uses IP based protocols (for example, IPv4 or IPv6) to provide communication to 5,000 utility meters. The utility meters meter a commodity provided by a utility (in the present example, the metered commodity is electricity, but other embodiments could also meter water, gas, or other commodities, alone or in combination). The utility nodes (which may include the meter or coupled to the meter to allow reading and/or control of the meter) include routing information to allow the nodes to communicate with one or more back office systems through multiple access point nodes. Most of the utility nodes in the utility network are unable to communicate directly with an access point node. Accordingly, packets sent to and from a given node as part of communication with the back office system typically are initially sent to another utility node, which relay the packets between the given node and one or more access point nodes. The utility nodes maintain and exchange reboot counters. The reboot counters are integer values representing the number of reboots the utility node has gone through. Reboot counters for utility nodes in the communications network are stored in flash memory of the utility nodes. For example, if a given utility node, designated UN-471, has rebooted three times it may maintain a reboot counter RebootCounter=3. Upon rebooting, utility node UN-471 will increment its reboot counter by 1, such that RebootCounter=4. Utility node UN-471 will share its reboot counter with its neighbor nodes (in this example, the nodes it is aware of and which it keeps information to communicate with). Sharing is done soon after incrementing the reboot counter, and may also be done regularly (for example, when updating link and other information, or when exchanging packets). When utility node UN-471 does reboot, it initially establishes contact with one or more neighboring nodes, based upon stored neighbor information. After establishing contact with one or more neighboring nodes, utility node UN-471 makes a request of at least one neighboring node to provide its reboot counter. If utility node UN-464 is the neighbor node in contact with utility node UN-471, and utility node UN-471 has requested utility node UN-464's reboot counter, utility node UN-464 may respond by giving its reboot counter, which is RebootCounter$_{received}$=6. Utility node UN-471 retrieves the stored reboot counter for UN-464, which is RebotCounter$_{stored}$=5. Utility node UN-471 compares the stored reboot counter for UN-464 RebotCounter$_{stored}$=5 to the received reboot counter RebootCounter$_{received}$=6, and based on the stored reboot counter RebootCounter$_{stored}$=5 not being equal to the received reboot counter RebootCounter$_{received}$=6, concludes that UN-464 has gone through a reboot since the last updating of the reboot counter for UN-464. Accordingly, it is determined that the routing information of UN-464 is not to be used for updating UN-471's routing information. Accordingly, UN-471 then seeks to find a node which has not incremented its reboot counter from the reboot counter UN-471 has stored for the node that UN-471 is seeking to find. UN-471 may compare the reboot counters of other nodes it has received and which it has a corresponding stored reboot counter. UN-471 may also request reboot counters from other utility nodes. Utility node UN-471 receives reboot counters for five other nodes, UN-469, UN-472, UN-473, UN-478 and UN-485, which UN-471 also has stored reboot counters for. From comparing the stored and received reboot counters, UN-471 determines that UN-485 and UN-473 have not incremented their reboot counters (both the stored and received reboot counters for UN-485 are equal to 2, while both the stored and incremented reboot counters for UN-473 are equal to 11). As UN-485 is upstream of UN-471 (that is, on the subnet that both UN-471 and UN-485 are on, UN-485 is fewer hops to the access point of the subnet, and packets from UN-471 to and from UN-485 may efficiently pass through UN-485 according to various routes) UN-471 uses information from UN-485 to update UN-471's routing information. Accordingly, UN-471 requests routing update information from UN-485, and uses the received route update information to update UN-471's routing information.

Example 2

A wireless mesh network of sensors (a wireless sensor network) has 800 sensor nodes. The mesh network has three distinct subnets, and some sensor nodes are on more than one subnet. Sensor nodes maintain a reboot timestamp, which indicates the last time the node has rebooted. One of the sensor nodes in the wireless mesh network, designated SN-206, last rebooted on Aug. 23, 2007 at 4:13 am, so its reboot time stamp RBTS=0823070413. SN-206 shares its time stamp with other nodes when other nodes request link or routing information from SN-206. SN-206 is on two subnets of the wireless mesh network, which are designated SUB-1 and SUB-2. SN-206 has ten neighbor nodes on SUB-1 which it maintains link information on, and also stores a reboot time stamp for all ten of these neighbor nodes. At 3.44 pm on Sep. 17, 2007, SN-206 rebooted. During the reboot process, SN-206 updated its reboot time stamp, which is now RBTS=0917071544. After reboot, SN-206 establishes contact with its neighbor sensor nodes, and requests time stamp information from all of its neighbor nodes. In this example embodiment, SN-206 waits until after its directly connected neighborhood stabilizes before it requests reboot information. Of the ten neighbor nodes on SUB-1, eight are able to respond. SN-206 compares the received time stamps to the stored time stamps for the eight nodes that responded. Of the eight neighbor nodes to SN-206 on SUB-1, only two have rebooted since the time SN-206 received the time stamps stored in SN-206's memory. SN-206 chooses one of the six neighbor nodes which it has determined have not recently rebooted to request routing update information. In this example embodiment, SN-206 chooses the neighbor with the lowest link cost which is "upstream" of SN-206 in subnet SUB-1, requests routing information from that node and uses the routing information it receives to update SN-206's routing information for sub-network SUB-1. Similarly, SN-206 also establishes contact with its neighbor nodes on subnet SUB-2. SN-206 has five neighbor nodes on SUB-2, and SN-206 requests reboot timestamp information from all five neighbors. All five respond by providing SN-206 with their current reboot timestamp. By comparing the stored and received reboot timestamps SN-206 determines that none of the responding neighbor nodes has rebooted recently. Accordingly, SN-206 chooses the neighbor with the lowest link cost which is "upstream" of SN-206 in subnet SUB-2, requests routing information from that node and uses the routing information it receives to update SN-206's routing information for SUB-2.

Example 3

A wireless mesh network of 1,200 communication nodes are arranged in a single network with no subnets. The communications nodes are arranged in a pre-defined geographical area. There are two access point nodes and multiple relay nodes in the wireless mesh communications network. Communications nodes keep track of reboots using reboot information, which is a recent reboot value indicating whether the communications node has rebooted within a preset period of time. Communications node CN-783 has not rebooted in more than one hour, so its recent reboot value is sent to zero ($RR_{CN-783}$=0). At 9:21 am on Sep. 19, 2007, CN-783 rebooted. During reboot, CN-783 set the recent reboot value to one ($RR_{CN-783}$=1) to indicate that CN-783 has recently gone through a reboot process. CN-783 requests reboot information from its direct access neighbors. CN-783 has seven direct access neighbors, five of which return a recent reboot value of one, indicating a reboot within the last hour. Two direct access nodes, CN-773 and CN-779, return a recent reboot value of zero, indicating that they have not rebooted within the last hour. Based on the returned recent reboot value, CN-783 chooses a direct access node which has not recently rebooted to receive routing updates. Based upon link cost factors, CN-783 chooses to request and receive routing information from CN-779 to update its routing information. One hour after reboot, if it has not gone through another reboot, CN-783 changes its recent reboot value back to zero, to indicate that CN-783 has not rebooted within the predetermined "recent" timeframe. Similarly, other communication nodes in the wireless mesh network update their recent reboot counters as configured.

Figure 4:
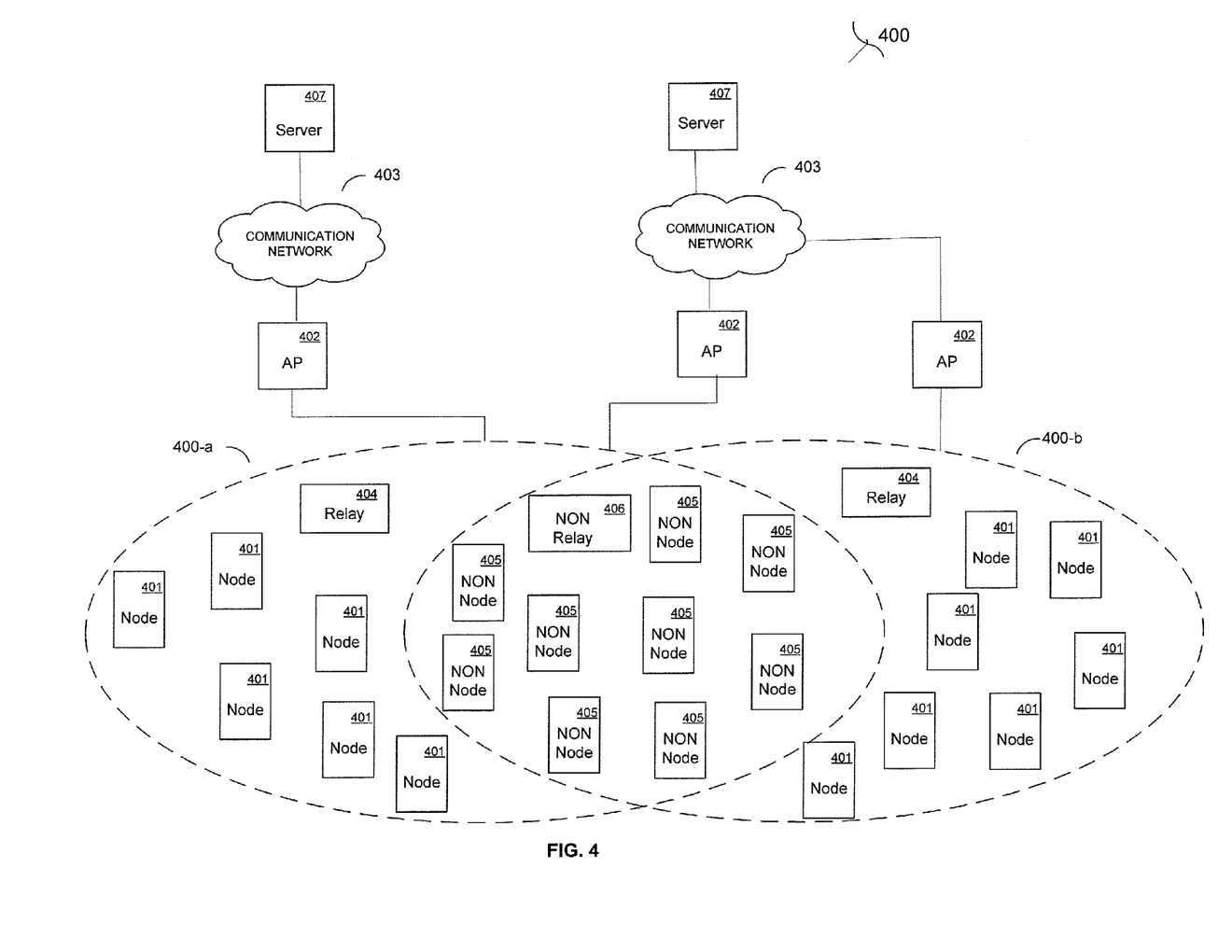
FIG. 4 is a generalized block diagram illustrating a communications network having a plurality of nodes, according to one possible embodiment.

FIG. 4 is a generalized block diagram illustrating a communications network 400 having a plurality of nodes 401. The nodes 401 are arranged into two sub networks 400-*a* and 400-*b*. Nodes which are members of two or more networks may be referred to as network overlap nodes (NONs) 405, or may be referred to as nodes participating in multiple networks. One example of a network overlap node is a node which is a member of multiple subnets within a given network. Subnets may be organized according to many possible criteria including, without limitation, geographic area. As discussed in examples below where subnets are geographically arranged, network overlap nodes may be able to communication on more than one of the subnet, as such network overlap nodes exist in an area where two or more subnets overlap. One or more nodes may also act as an access point (or gateway) 402 to another network 403. One or more electronic computing devices 407 may be connected to the communications network 403. Examples of electronic computing devices include, without limitation, servers, personal computers, handheld devices, mobile computing devices, mobile telephones, etc. One or more nodes may also be relay nodes 404 which relay packets between nodes, and/or between one or more nodes 401 and the gateway 402. A relay node may also be part of two more subnets, and may be referred to as a network overlap relay node (NON relay) 406.

As above, in communication networks which have access point nodes, one node may be considered "upstream" of another node in the sense that it is closer to the access point node (closer may refer to number of hops, geographic proximity, to link cost, link reliability, some combination thereof, or additional factors). The "downstream" node may prefer and/or choose to receive routing updates from an upstream node.

During operation of the communications network 400 a node or network overlap node may reboot (voluntarily or involuntarily) for any number of reasons, including, without limitation, power loss, operational maintenance, automatic service disconnects, routine node refresh after firmware upgrades, or for other reasons. When the rebooting node comes back up after a reboot, it is preferable to receive routing information from other nodes, as the rebooting node may not have been able to receive routing information updates while it was "down." As other nodes in the communications network may also have gone down and have recently rebooted, the rebooting node may prefer to receive routing updates or other updates from nodes that have not recently rebooted, or have at least rebooted prior to the rebooting node and which are more likely to have more current routing information. Additionally, a rebooting node may prefer to receive routing update information from a network overlap node, as such nodes may have more up to date routing or other information, or the network overlap node may provide access to a given node or network through another network the network access node is able to communicate on.

Figure 5:
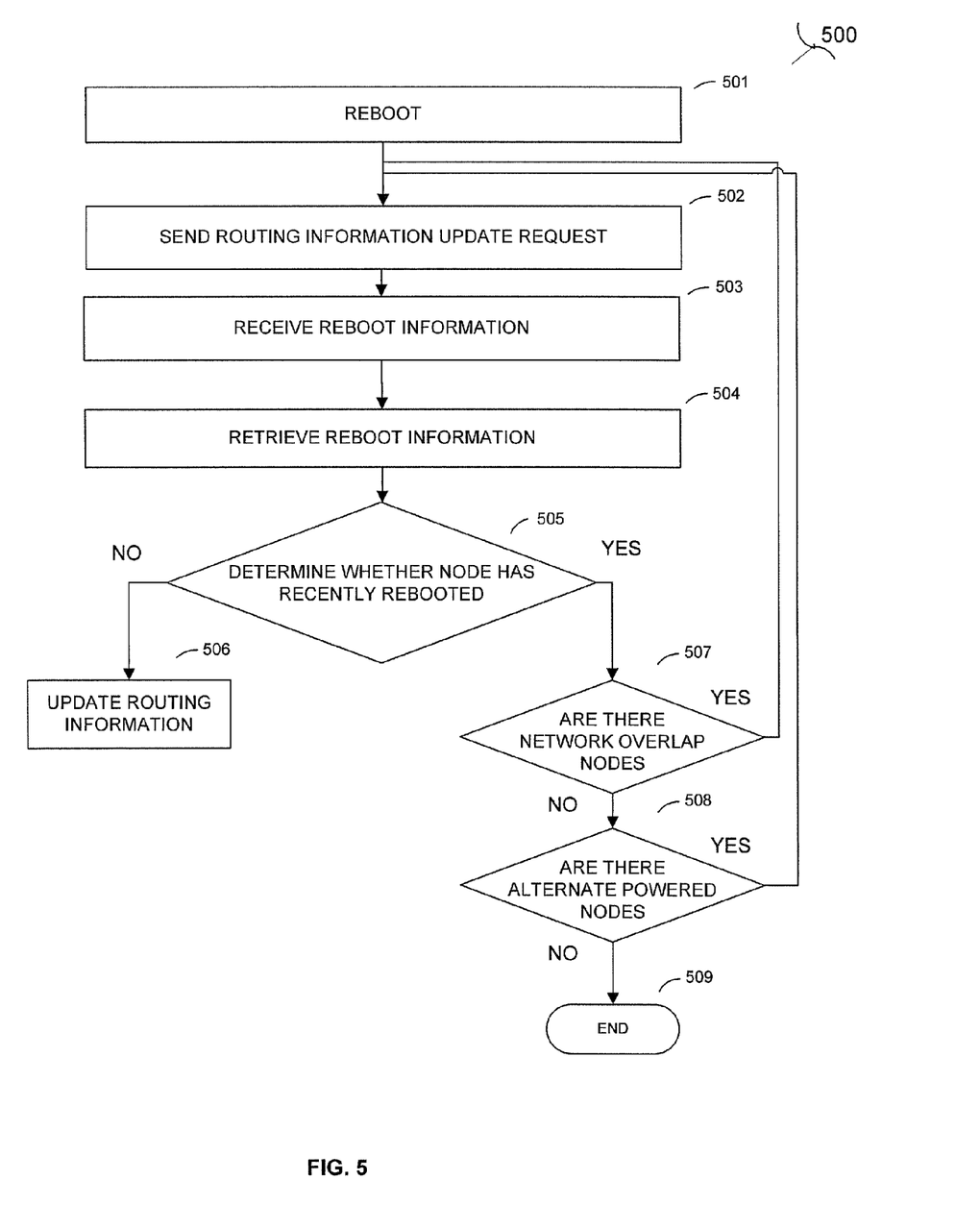
FIG. 5 is a generalized flow diagram illustrating a process of discovering nodes for information updates by a rebooting node, according to one possible embodiment.

FIG. 5 is a generalized flow diagram illustrating a process 500 of discovering nodes for information updates by a rebooting node. At step 501 a first node (or rebooting node) reboots. During, or after, reboot the first node may initiate a routing update process where, at step 502, the first node sends routing information update messages to at least one neighboring node. In one preferred embodiment, the first node sends routing update messages to nodes which it is already aware of. The nodes the first node is aware of may be contained in a list, which may be stored in volatile or non-volatile memory at its location or at a different location which it can securely and reliably access. Preferably, these nodes are neighboring nodes. Alternatively, the first node may initiate a discovery process to discover nodes, as may be done when the first node is unaware of other nodes in the communications network (as may occur due to the first node joining the network, or if the list of known nodes was lost or deleted, or when the list of known nodes is unreachable or deemed unreliable). Routing updates may include the reboot information of the first node, and may include a request for reboot information updates. The list of discovered nodes may be used for the routing update messages sent at step 502. At step 503 the first node receives the routing update information. In one preferred embodiment, the routing update information response includes reboot information. In alternate embodiments, reboot information may be received in a separate message, which may be received in response to the routing update request, in response to a reboot information request, in response to a request for other information, or automatically without a request from the rebooting node. At step 504 the first node may retrieve reboot information it keeps on other nodes. As discussed above, reboot information may be stored in memory, or in another accessible device or storage unit, and at step 504 the first node retrieves stored reboot information on other nodes from this location. In the preferred embodiment, the retrieved reboot information may correspond to at least one node associated with the received reboot information, such that the first node has access to both the stored the reboot information and the received reboot information for at least one node.

At step 505 the first node may examine, for example by comparing, the stored the reboot information and the received reboot information for at least one node to determine whether the associated node, or nodes, has recently gone through a reboot. More particularly, the first node may make a determination as to whether a given node, corresponding to the stored the reboot information and the received reboot information, has routing information more current than the first node. If the given node has not rebooted since receiving the corresponding stored reboot information, or if the given node has not rebooted within a predefined time prior to the reboot of the first node, then the first node may determine to use reboot information available from the given node to update its routing information. The comparison made may vary according to the type of the reboot information available. For example, if the reboot information is a reboot counter the comparison may be whether the stored reboot counter is equal to the received reboot counter. If the stored reboot counter is equal to the received reboot counter it may be determined that the given node has not rebooted since receipt of the stored reboot counter, and that the first node will update its routing information using the routing information from the given node. If at step 505 it is determined that at least one node in the comparison has routing information which is more current than the routing information of the first node, then at step 506 the first node will update the routing information using the routing information from at least one of the nodes determined to have more current routing information than the first node. If the routing information has not already been received, the first node may make a request for the routing information to be used in updating the first node.

If none of the nodes examined at step 505 are determined to have routing information more current than the first node's routing information, then at step 507 the first node may determine whether there are network overlap nodes which may be compared. The determination of whether there are network overlap nodes to examine or retrieve update information from may be based upon different types of information, which may exist or be retrieved from various locations. For example, the first node may maintain a list of network overlap nodes, which may be stored in the node's memory. The node may compare information it has on nodes to determine if any node is also able to communicate on a second (or more) network(s). Alternative embodiments may have the first node send messages to request information which either identify network overlap nodes, or allow it to determine network overlap nodes from the responses to network overlap node information requests.

If there are network overlap nodes, then the first node may return to step 502 to request information on the network overlap node, or may return to another step as appropriate, to examine the network overlap node to determine whether it has also gone through a recent reboot. In the presently preferred embodiment, the first node will not choose a network overlap node for routing information updates if the network overlap node has recently gone through a reboot. However, alternate embodiments may choose to receive reboot information from a network overlap node which has recently rebooted in the event it is unable to find another node which has not recently rebooted, including no other network overlap nodes.

In one preferred embodiment, if no network overlap nodes are found, or no network overlap nodes are found which have not recently rebooted, then the first node may proceed to step 508 where it may determine whether there are alternate power nodes. Alternate power source nodes may be any node which has an alternate power source. For example, if the first node is on a first electrical power network, the reboot may have been the result of a loss of electrical power on the first electrical power network. Nodes which use an alternate power source, that is a power source different from the first electric power network, may not experience power loss at when the first electrical power network experienced an outage, or power loss. Examples of alternate power sources may be a separate electrical grid, an "off grid" power source (as may occur with backup generators, alternative power sources such as wind, solar, etc.), a battery or a backup battery (a backup battery node which normally operates on power from a source such as the first electrical power source but which also has a battery to provide power in the event of loss of the primary power source or sources). The determination of whether there are alternate power nodes to examine or request update information from may be based upon different types of information, which may exist or be retrieved from various locations. For example, the first node may maintain a list of alternate power nodes, which may be stored in the first node's memory. The first node may compare information it has on nodes to determine if any node is an alternate power node. Alternative embodiments may have the first node send messages to request information which either identify alternate power nodes, or allow it to determine alternate power nodes from the responses to alternate power nodes information requests. If at step 508 the first node determines there are alternate power nodes, then the first node may return to step 502 to request information on the alternate power node(s), or may return to another step as appropriate, to examine the alternate power nodes to determine whether it has also gone through a recent reboot. In the presently preferred embodiment, the first node will not choose a alternate power nodes for routing information updates if the alternate power nodes has recently gone through a reboot. However, alternate embodiments may choose to receive reboot information from a alternate power nodes which has recently rebooted in the event it is unable to find another node which has not recently rebooted, including no other alternate power nodes.

If no additional nodes may be examined, the process may end at step 509. If at step 507 or 508 the first node determines that there are additional nodes to be compared, it may return to step 502 to obtain additional information from other nodes, and follow the process of comparison from step 502. As the first node may have compared all of the nodes that it keeps reboot information on, the first node may proceed to step 502 to request stored reboot information for other nodes as well as request. Alternatively, if at step 507 or 508 the first node determines that there are additional nodes to be examined for a recent reboot and the first node has the information needed for examination, then the first node may return to steps 504, 505, or any other step as appropriate.

The first node may, at step 505, compare the stored and received reboot information of other nodes known to the first node until it is able to find a node having routing information more current than the first node's routing information. This may include sending out other reboot information requests for reboot information of other nodes. If a node is found which has not recently rebooted, then the first node proceeds to step 506 to update its routing information.

While the process illustrated in FIG. 5 has the first node examine nodes to find either a network overlap node or an alternate power nodes, other embodiments may attempt to find either a node which is both an alternate power nodes and a network overlap node. While the process illustrated in FIG. 5 has the first node examine nodes to find a network overlap node prior to examining nodes to find an alternate power nodes, other embodiments may attempt to find alternate power nodes before attempting to find a network overlap node, or may attempt to find network overlap nodes and alternate power nodes in parallel, or may attempt to find either a network overlap node or an alternate power node, without attempting to find both and alternate power node or a network overlap node. While the process illustrated in FIG. 5 has the first node compare a node for a recent reboot after determining the node is an alternate power node or the node is a network overlap node, alternate embodiments may proceed directly to receive and/or using routing update information after determining a found node is either (or both) a network overlap node or (and) an alternate power node. While the process illustrated in FIG. 5 has the first node examine nodes to determine whether a node has recently rebooted prior to examining node(s) to find either (or both) a network overlap node or (and) an alternate power nodes, other embodiments may attempt to find either (or both) a alternate power nodes or (and) a network overlap node prior to an attempt to find nodes which are not either (or both) a alternate power nodes or (and) a network overlap node and which have not recently rebooted.

The above processes may be combined, in whole or in part, with our without modification, in various embodiments. For illustration purposes, multiple exemplary embodiments are provided below.

Example 4

A wireless mesh network of 6,000 utility nodes which are coupled to utility meters. The wireless utility nodes are arranged in two subnets, referred to as UN-SUB1 and UN-SUB2. Both UN-SUB1 and UN-SUB2 have a single access point node. A utility node in the network, designated M2381, resides in UN-SUB1. Utility node M2381 has twenty six direct access neighbors. M2381, and the other utility nodes in the network, maintain neighbor reboot information in its nonvolatile memory. Specifically, utility network nodes in this embodiment use a reboot counter, which they regularly exchange with their neighbors during routine network maintenance messaging. After a reboot, M2381 requests reboot counters from other nodes, including its direct link neighbors. The neighboring nodes respond with their respective reboot counters. Utility node M2381 compares the received reboot counters with the corresponding stored reboot counters and determines that all of the responding nodes have also recently gone through a reboot. Utility node M2381 requests reboot information of additional nodes. Specifically, M2381 requests reboot information from upstream nodes. After receiving responses and comparing the received and stored reboot counters, no node is discovered which has not recently undergone a reboot. Utility node M2381 concludes the subnet UN-SUB1 has undergone a general outage. Accordingly, utility node M2381 then sends request for route advertisement messages to one or more network overlap node to receive routing update information. The network overlap nodes selected to receive route advertising messages are retrieved from the memory of utility node M2381. By chance, none of the network overlap nodes retrieved from memory are among the nodes M2381 has already been contacted. Based on the responses received from the queried network overlap nodes, one network overlap node M3947 is determined to not have rebooted within the time-frame in question. Accordingly, M2381 proceeds to update its routing information based on routing information obtained from M3947.

While in the above example network overlap nodes are not among the immediate nodes that were contacted earlier by M2381 after reboot, other embodiments may have one or more network overlap nodes among the nodes contacted during the request for reboot information and prior to determining the subnet had undergone a general outage.

Example 5

A wireless mesh network of 10,000 utility nodes, with the utility nodes coupled to utility meters. The wireless utility nodes are arranged into multiple subnets, including subnets UN-SUB6 and UN-SUB7. Both UN-SUB6 and UN-SUB7 each have a single access point node. A utility node in the network, designated UM6411, resides in UN-SUB6. Utility node UM6411 has fifty three direct access neighbors. After a reboot, UM6411 requests subnet membership information from multiple nodes. The neighboring nodes respond with their subnet membership information. Utility node UM6411 analyses the received subnet membership information to determine if any of the responding nodes are on a subnet other than the subnet UM6411 is a member of, specifically subnet UN-SUB6. Another utility node, which responded with subnet membership information, UM7948 is a member of UN-SUB7, as well as UN-SUB6, and is therefore a network overlap node. Accordingly, utility node UM6411 then sends a request for route advertisement messages to UM7948 to receive routing update information. Accordingly, UM6411 proceeds to update its routing information based on routing information obtained from UM7948.

While in the above example node UM6411 was able to locate a network overlap node from a first request for subnet membership information, other embodiments may require multiple messages be sent to locate a network overlap node.

While in the above example node UM6411 was able to locate a network overlap node from a first request for subnet membership information sent after reboot, other embodiments may have nodes check their stored information to locate a network overlap node prior to sending a request for subnet membership information.

While in the above example node UM6411 was able to locate a network overlap node, in other embodiments a node may not be able to locate a network overlap node, and may check reboot information of other nodes to receive reboot information from nodes which have not recently rebooted, as described in other embodiments above.

While the above example embodiments updated routing information based on reboot information, other embodiments may update other information including, but not limited to, path and link costs, ambient noise levels, info-success percentages with reference a set of upstream nodes, MAC addresses, time synchronization information, and FHSS spreading sequence codes. Routing information may include the complete path to a destination, a partial path to a destination, or a next node to forward a packet to for reaching a destination, or any information a node may use in routing a packet to a destination. Note, the destination need not be on the same subnet or network as the node.

In some other embodiments, the rebooted requesting node may select a node for routing information and update and possible next hop choice based on its uptime (defined as how long the node has been in service and in operation) among other nodes which may all have the same reboot counter setting and path costs.

The embodiments presented herein combine sub-systems and functionalities to illustrate the presently preferred embodiments. Alternative embodiments may include fewer or additional sub-systems, processes, or functional aspects, or may be used with other sub-systems, processes, or functional aspects, depending on the desired implementation. Various features and advantages of the present invention are set forth in the following claims.

The invention claimed is:

1. A method of updating routing information by a first node in a network, comprising:
   storing routing information of a first node in the network in a memory associated with the first node;
   storing, in the memory, reboot information of a second node in the network, the reboot information of the second node including information on whether the second node has undergone a reboot;
   upon reboot of the first node in the network, receiving reboot information from the second node in the network;
   retrieving, from the memory, the stored reboot information for the second node;
   comparing, in the first node, the received second node reboot information to the retrieved second node reboot information, to determine, in the first node, whether the second node has been rebooted as recently as the reboot of the first node; and
   updating the stored routing information of the first node with routing information downloaded from the second node, if the second node is not determined to have been rebooted more recently than the reboot of the first node.

2. The method of claim 1, wherein the reboot information includes a reboot counter, and wherein a higher value of the reboot counter indicates a greater number of reboots by the node associated with the reboot counter.

3. The method of claim 2, wherein the reboot information also includes reboot time information indicating the last time the reboot counter was updated.

4. The method of claim 2, further comprising:
   in the event the reboot counter indicates the second node has recently gone through a reboot, requesting and receiving reboot information from at least one other node in the network until a node is found where the reboot information received from the found node indicates that the found node has not gone through a reboot as recently as the first node; and
   updating the routing information stored in the memory of the first node with routing information downloaded from the found node.

5. The method of claim 4, further comprising:
   upon reboot of the first node in the network, sending a reboot information request to a plurality of nodes, wherein information identifying the plurality of nodes is stored in the memory associated with the first node.

6. The method of claim 1, further comprising:
in the event a node is not found whose associated reboot information indicates that the node has not rebooted as recently as the first node,
selecting an alternate power node;
retrieving routing update information from the selected alternate power node; and
updating the stored routing information of the first node with the routing update information retrieved from the selected alternate power node.

7. A method of updating routing information among nodes in a network, comprising:
storing routing information of a first node in the network in a non-volatile memory associated with the first node;
receiving reboot information at the first node from at least one additional node in the network, the received reboot information including a reboot counter, the reboot counter indicating the number of reboots the at least one additional node associated with the received reboot information has performed;
storing the received reboot information in the non-volatile memory;
in the event the first node reboots, requesting reboot information from the at least one additional node in the network;
receiving updated reboot information from the at least one additional node in the network, the received updated reboot information including a reboot counter indicating the number of reboots the at least one additional node associated with the received updated reboot information has performed;
retrieving the stored reboot information of the at least one additional node from the non-volatile memory;
comparing, in the first node, the received updated reboot information from the at least one additional node in the network to the retrieved stored reboot information of the at least one additional node, to determine, in the first node, whether the at least one additional node has not rebooted since the retrieved stored reboot information was received; and
updating the stored routing information of the first node with routing information from the at least one additional node that has not been rebooted since the retrieved stored reboot information was received, if the at least one additional node is determined to not have rebooted since the retrieved stored reboot information was received from the at least one additional node.

8. The method of claim 7, further comprising:
requesting routing information from the at least one additional node that has not rebooted since the retrieved stored reboot information of the at least one additional node was received, if the at least one additional node has not rebooted since the retrieved stored reboot information of the at least one additional node was received.

9. The method of claim 7, wherein the reboot counter included in the reboot information received from the at least one additional node is an integer value indicating the number of reboots the at least one additional node has respectively performed.

10. The method of claim 9, further comprising:
incrementing a first node reboot counter upon reboot of the first node; and
transmitting the first node reboot counter to at least one other node in the network.

11. The method of claim 10, wherein the first node reboot counter is transmitted in response to a routing update request received from another node in the network.

12. The method of claim 10, wherein the first node reboot counter is transmitted in a request for reboot information from the first node to at least one other node in the network.

13. The method of claim 10, wherein the first node reboot counter is transmitted in response to the incrementing of the first node reboot counter.

14. The method of claim 7, further comprising:
receiving, in the first node, respective reboot information from a plurality of nodes in the network, the received reboot information including a reboot counter of a corresponding one of the plurality of nodes from which the reboot information was received, the reboot counter indicating the number of reboots the corresponding one of the plurality of nodes has performed;
storing the reboot information received from each of the plurality of nodes in the non-volatile memory;
receiving, in the first node, updated reboot information from the plurality of nodes, the received updated reboot information including a reboot counter of a corresponding one of the plurality of nodes from which the reboot information was received, the reboot counter indicating the number of reboots the corresponding one of the plurality of nodes has performed;
retrieving the stored reboot information of the plurality of nodes from the non-volatile memory;
comparing, in the first node, the received updated reboot information from the plurality of nodes to the retrieved stored reboot information of the plurality of nodes, respectively, to determine, in the first node, whether any of the plurality of nodes has not rebooted since the retrieved stored reboot information was received from the any of the plurality of nodes;
selecting at least one of the plurality of nodes which is determined to not have been rebooted since the retrieved stored reboot information was respectively received from the plurality of nodes; and
updating the stored routing information of the first node with routing information obtained from the selected at least one of the plurality of nodes.

15. A method, comprising:
upon reboot of a first node in a first network, determining, in the first node, whether a preset group of additional nodes in the first network have also gone through a reboot;
in the event the determination is made that the preset group of additional nodes have also gone through a reboot, selecting a network overlap node, which is a member of the first network and a member of a second network different from the first network;
retrieving update information from the selected network overlap node, the update information including reboot information indicating whether the selected network overlap node has recently undergone a reboot;
determining, in the first node, whether the selected network overlap node has undergone a reboot as recently as the first node; and
receiving, in the first node, updated routing information from the selected network overlap node, if the selected network overlap node is not determined to have been rebooted more recently than the reboot of the first node.

16. The method of claim 15, wherein the determination of whether the preset group of nodes have gone through a reboot includes:

comparing received node reboot information for a node from the preset group of nodes to the retrieved node reboot information for the node from which the node reboot information was received;

comparing the received node reboot information and the retrieved node reboot information to determine whether the associated node has not gone through a reboot as recently as the first node; and updating the stored routing information of the first node with routing information downloaded from the node determined to have not gone through a reboot as recently as the first node.

17. The method of claim 16, wherein the reboot information includes a reboot counter, and wherein a higher value of the reboot counter indicates a greater number of reboots by the node associated with the reboot counter.

18. The method of claim 17, wherein the reboot information also includes reboot time information indicating the last time the reboot counter was updated.

19. The method of claim 17, further comprising:
in the event the reboot counter indicates that the node associated with the reboot counter has recently gone through a reboot, requesting and receiving reboot information from at least one other node from the preset group of nodes until a node is found where the reboot information received from the found node indicates that the found node has not gone through a reboot as recently as the first node; and
updating the routing information of the first node with routing information downloaded from the found node.

20. The method of claim 15, wherein the selection of the network overlap node comprises comparing the network addresses corresponding to a given node to determine whether the given node has a network address corresponding to a different network.

21. The method of claim 15, further comprising:
in the event a network overlap node is not available for receiving update information,
selecting an alternate power node; and
retrieving update information from the selected alternate power node.

22. A method of updating routing information by a first node in a network, comprising:
upon reboot of a first node in a network, receiving reboot information from a second node in the network, the received reboot information including a reboot counter indicating whether the second node has rebooted;
retrieving reboot information for the second node from a memory associated with the first node;
comparing, in the first node, the received second node reboot information to the retrieved second node reboot information, to determine, in the first node, whether the second node has gone through a reboot as recently as the first node;
updating the routing information of the first node with routing information downloaded from the second node, if the second node is not determined to have gone through a reboot as recently as the first node;
in the event the reboot counter associated with the second node indicates that the second node has recently gone through a reboot, requesting and receiving reboot information from at least one other node in the network until a node is found where the received reboot information indicates that the found node has not gone through a reboot as recently as the first node; and
updating the routing information of the first node with routing information downloaded from the found node.

23. The method of claim 22, further comprising:
upon reboot of the first node in the network, sending a reboot information request to a plurality of nodes, wherein information identifying the plurality of nodes is stored in the memory associated with the first node.

24. A method of updating routing information by a first node in a network, comprising:
upon reboot of a first node in a network, receiving reboot information from a second node in the network;
retrieving reboot information for the second node from a memory associated with the first node;
comparing, in the first node, the received second node reboot information to the retrieved second node reboot information, to determine, in the first node, whether the second node has gone through a reboot as recently as the first node;
updating the routing information of the first node with routing information downloaded from the second node, if the second node is not determined to have gone through a reboot as recently as the first node;
selecting an alternate power node, if a node is not found whose associated reboot information indicates that the node has not been rebooted as recently as the first node;
retrieving routing update information from the selected alternate power node; and
updating the routing reboot information of the first node with the routing update information retrieved from the selected alternate power node.

25. A method comprising:
upon reboot of a first node in a network, determining whether a preset group of nodes have also gone through a reboot by (i) comparing received node reboot information for a node from the preset group of nodes to retrieved node reboot information for the node from which the node reboot information was received, the reboot information of the compared node including a reboot counter indicating a number of reboots that the node associated with the reboot counter has performed, and (ii) in the event the comparison of the received node reboot information and the retrieved node reboot information indicates that the compared node has not gone through a reboot as recently as the first node, updating the routing information of the first node with routing information downloaded from the node not determined to have gone through a reboot as recently as the first node;
in the event the reboot counter indicates that the compared node has recently gone through a reboot, requesting reboot information from at least one other node from the preset group of nodes until a node is found where the reboot information indicates the found node has not gone through a reboot as recently as the first node;
updating the routing information of the first node with routing information downloaded from the found node;
in the event the determination is made that the present group of nodes have also gone through a reboot, selecting a network overlap node; and
retrieving update information from the selected network overlap node.

26. A method comprising:
upon reboot of a first node in a network, determining whether a preset group of nodes have also gone through a reboot;
in the event the determination is made that the present group of nodes have also gone through a reboot, selecting a network overlap node;

retrieving update information from the selected network overlap node;
selecting an alternate power node if a network overlap node is not available for receiving update information;
retrieving update information from the selected alternate power node.

* * * * *